United States Patent
Kato et al.

(10) Patent No.: US 6,833,117 B1
(45) Date of Patent: Dec. 21, 2004

(54) EXHAUST EMISSION CONTROL CATALYST ELEMENT, CATALYST STRUCTURE, PRODUCTION METHOD THEREOF, EXHAUST EMISSION CONTROL APPARATUS AND EXHAUST EMISSION CONTROL METHOD USING THE APPARATUS

(75) Inventors: Yasuyoshi Kato, Kure (JP); Yoshinori Nagai, Kure (JP); Kouichi Yokoyama, Kure (JP); Naomi Yoshida, Kure (JP); Takashi Michimoto, Hiroshima (JP); Eiji Miyamoto, Kure (JP); Masatoshi Fujisawa, Kure (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/530,844

(22) PCT Filed: Nov. 12, 1998

(86) PCT No.: PCT/JP98/05098

§ 371 (c)(1), (2), (4) Date: Jun. 14, 2000

(87) PCT Pub. No.: WO99/24165

PCT Pub. Date: May 20, 1999

(30) Foreign Application Priority Data

Nov. 12, 1997 (JP) .............................................. 9-310235
Jun. 25, 1998 (JP) ........................................... 10-178293
Sep. 9, 1998 (JP) ........................................... 10-255447

(51) Int. Cl.$^7$ .......................... B01D 50/00; B01D 53/34
(52) U.S. Cl. ...................................... 422/177; 422/171
(58) Field of Search .............................. 422/177, 171, 422/181; 502/439, 308, 311

(56) References Cited

U.S. PATENT DOCUMENTS 4,881,883 A * 11/1989 Michimoto et al. ............ 425/89
5,011,810 A * 4/1991 Michimoto et al. .......... 502/439
5,059,576 A * 10/1991 Kato et al. .................... 502/309
5,155,083 A * 10/1992 Yoshida et al. .............. 502/242
5,792,432 A * 8/1998 Kato et al. .................... 422/171
5,881,553 A * 3/1999 Steenackers et al. ........... 60/299
6,063,342 A * 5/2000 Kato et al. .................... 422/171

FOREIGN PATENT DOCUMENTS

JP 48-56208 8/1973
JP 55-134644 10/1980

* cited by examiner

Primary Examiner—M. Alexandra Elve
(74) Attorney, Agent, or Firm—Fay, Sharpe, Fagan, Minnich & McKee, LLP

(57) ABSTRACT

The catalyst structure of the present invention for purifying an exhaust gas is preferable for increasing the contact of an exhaust gas, to be treated, with a catalyst by disturbing the flow of the exhaust gas in a gas flow passage thereby obtain a highly efficient and compact apparatus for treating the exhaust gas. Such catalyst structure is produced by forming two or more catalyst elements each supporting a catalyst component on its surface and having flat plate portions and level-changing portions formed alternately therein with the angle formed between the flat plate portion and the level-changing portion being in a specific range, and then stacking the catalyst elements in a frame. A catalyst structure is also obtained by stacking a large number of the catalyst elements described above through metallic, ceramic, or glass netlike members interposed therebetween and each having a large number of perforated holes. The catalyst structure has such advantages that dust is hardly deposited between the catalyst elements, that a sufficiently high strength can be obtained even when the thickness of catalyst elements is reduced, and that the catalyst structure can be placed in an exhaust gas flue to use as an exhaust gas treating apparatus. When the exhaust gas treating apparatus is employed, an efficient exhaust gas treatment can be effected without damaging the catalyst elements while repressing the pressure loss.

5 Claims, 9 Drawing Sheets

(a)

(a) 1A (b)

(a)

(b)

(a)

(b)

(c)

(a)

(b)

(a)

(b)

(c)

EXHAUST EMISSION CONTROL CATALYST ELEMENT, CATALYST STRUCTURE, PRODUCTION METHOD THEREOF, EXHAUST EMISSION CONTROL APPARATUS AND EXHAUST EMISSION CONTROL METHOD USING THE APPARATUS

TECHNICAL FIELD

The present invention relates to catalyst elements and catalyst structures for purifying exhaust gases; processes for producing the catalyst elements and catalyst structures; apparatuses for purifying exhaust gases; and processes for purifying exhaust gases by using the apparatus. Particularly, the invention relates to catalyst elements and catalyst structures, used for purifying exhaust gases, in which airflow loss is small, dust in an exhaust gas is hardly deposited, and the contact between the gas, to be treated, with a catalyst is increased to greatly raise the reaction speed; processes for producing the catalyst elements and catalyst structures; exhaust gas purifying apparatuses; processes for purifying exhaust gases by using the apparatus.

BACKGROUND ART

Nitrogen oxides ($No_x$) in exhaust gases discharged from power plants, various plants, automobiles, and others are causative agents for photochemical smog and acid rain. As a method for efficiently removing $NO_x$, an exhaust gas denitration method by selective catalytic reduction using ammonia ($NH_3$) or the like as reducing agent has widely been employed. As catalyst, a titanium dioxide ($TiO_2$) type catalyst containing vanadium (V), molybdenum (Mo), or tungsten (W) as active component has been used. Particularly, a catalyst containing vanadium as one of the active components has become a mainstream of current denitration catalysts since the catalyst is not only high in activity, but also is small in deterioration due to impurities contained in exhaust gases and can be used from a comparatively low temperature (Laid-open Japanese Patent Publication No. Sho 50-128681 and others).

For example, a catalyst structure is known which is produced by using metal laths to which aluminum is flame sprayed, or woven fabrics or nonwoven fabrics of ceramic fibers as substrates, coating a catalyst component thereon, rolling the metal laths or the fabrics to obtain plate-shaped catalysts (catalyst elements), processing them into such a waveform as shown in FIG. 15(*a*), and then assembling two or more of the waveform catalysts in a stacked state as its cross sectional side view is shown in FIG. 15(*b*) (Laid-open Japanese Patent Publication Nos. Sho 54-79188 and Sho 59-73053). On the other hand, other catalyst structures are known in which one of other waveforms of catalysts, or one of other waveforms of catalysts and flat catalysts are combined. For example, catalyst structures cross sectional side view of which are shown in FIG. 16(*a*), (*b*), or (*c*) are specifically known (Laid-open Japanese Patent Publication Nos. Sho 53-136656 and Sho 64-12627).

However, catalyst structures produced by stacking conventional catalyst elements have a high pressure loss. Besides, it is difficult to obtain catalyst structures having a sufficiently high strength from conventional catalyst elements since they are apt to deform. Further, conventional catalyst structures have such a problem that a high catalytic activity can not be obtained since contact area between catalyst elements is large leading to a narrow effective catalyst area, and thus dust is apt to deposit in the structures.

First object of the present invention is to provide catalyst elements and catalyst structures having advantages that dust is hardly deposited between catalyst elements and that the elements and structures have a sufficiently high strength even when the thickness of the elements is reduced.

Second object of the present invention is to provide processes by which catalyst elements and catalyst structures can be produced economically and in large quantities.

Third object of the present invention is to provide catalyst structures in which the contact area between catalyst elements is small and thus catalysts are efficiently used.

Fourth object of the present invention is to provide apparatuses and processes for purifying exhaust gases in which the gas flow in a gas flow passage is disturbed to increase the contact between the gas, to be treated, with a catalyst thereby catalytic activity can be improved.

DISCLOSURE OF THE INVENTION

The present invention is summarized as follows:

(1) A catalyst structure for purifying an exhaust gas comprising a stack of two or more catalyst elements and a frame to house the stack, each of the catalyst elements being formed by bending a rectangular or square plate supporting a catalyst component on its surface into a shape of stairs in the direction parallel to the direction of a pair of sides of the plate at a predetermined interval so that flat plate portions (hereinafter "flat plate portions" means portions corresponding to tread portions in stairs as shown in Figures) and level-changing portions (hereinafter "level-changing portions" means portions corresponding, for example, to riser (upright) portions in stairs or the portions similar thereto as shown Figures) are alternately formed in the element, the catalyst elements being stacked such that the position of the level-changing portions are shifted by a predetermined length between adjoining catalyst elements, and the catalyst elements forming gas flow passages having a rectangular or rhombic cross section between the adjoining catalyst elements.

(2) The catalyst structure for purifying an exhaust gas recited in paragraph (1) above wherein a catalyst element in the stack is contacted with adjoining catalyst elements at three or more points at the ends of the level-changing portions and in the vicinity thereof in total to support each other.

(3) The catalyst structure for purifying an exhaust gas recited in paragraph (1) or (2) above wherein the length of the flat plate portions and the height of the level-changing portions are the same in each of the catalyst elements.

(4) The catalyst structure for purifying an exhaust gas recited in paragraph (1) or (2) above wherein a relation of $$p > s$$

exists between the length p of the flat plate portions and the height s of the level-changing portions in the catalyst elements, and the angle formed between the level-changing portions and the flat plate portions in the catalyst elements is 90° or more (as shown in FIG. 2).

(5) The catalyst structure for purifying an exhaust gas recited in paragraph (1) or (2) above wherein the length of each of the catalyst elements is an integral multiple of the sum of the height of the level-changing portions and the length of the flat plate portions.

(6) The catalyst structure for purifying an exhaust gas recited in any one of paragraphs (1) to (5) wherein each of the catalyst elements are formed by applying a catalyst component containing at least two metals selected from the group consisting of titanium, vanadium, molybdenum, and tungsten to a metallic, ceramic, or glass netlike substrate such that the catalyst component is filled in the meshes of the netlike substrate.

(7) A catalyst element used for the catalyst structure for purifying an exhaust gas recited in paragraph (1) above and formed by bending a rectangular or square plate supporting a catalyst component on its surface into a shape of stairs in the direction parallel to the direction of a pair of sides of the plate at a predetermined interval so that flat plate portions and level-changing portions are alternately formed in the element.

(8) A process for producing a catalyst structure for purifying an exhaust gas comprising forming a predetermined length of flat plate portions and a predetermined height of level-changing portions alternately in a belt-shaped substrate for catalyst element so that a stairs-like substrate is prepared, cutting in turn the flat plate portions of the stairs-like substrate thus obtained in the direction parallel to the direction of the edges formed by the level-forming portions and the flat plate portions such that the following relation is established between the whole length W of each of the cut catalyst elements and the distance L between adjacent level-changing portions in each of the elements:

$$W = n \times L + L - d$$

wherein n represents the number of the level-changing portions per one sheet of the element, and d represents a constant which is smaller than L but larger than 0, to form two or more catalyst elements, and then stacking the catalyst elements (as shown in FIG. 3).

(9) The process for producing a catalyst structure for purifying an exhaust gas recited in paragraph (8) above wherein a catalyst component having a catalytic activity is supported on the belt-shaped substrate for an catalyst element before or after the belt-shaped substrate is cut into catalyst elements having a predetermined whole length of W.

(10) A process for producing a catalyst structure for purifying an exhaust gas comprising cutting in advance a belt-shaped substrate for catalyst element to such a predetermined length that the following relation is established between the whole length W of each of the catalyst elements and the distance L between adjacent level-changing portions in each of the elements to be formed:

$$W = n \times L + L - d$$

wherein n represents the number of the level-changing portions per one sheet of the element, and d represents a constant which is smaller than L but larger than 0, to obtain two or more unit catalyst elements, forming a predetermined length of flat plate portions and a predetermined height of level-changing portions alternately in each of the catalyst elements so that the position of the flat plate portions and the level-changing portions to be formed are each shifted by a length of d between adjoining catalyst elements, and then stacking the catalyst elements.

(11) The process for producing a catalyst structure for purifying an exhaust gas recited in paragraph (10) above wherein a catalyst component is supported on the belt-shaped substrate for catalyst element before or after the substrate is cut into catalyst elements having a predetermined whole length of W.

(12) A catalyst structure for purifying an exhaust gas comprising a stack of two or more catalyst elements and a frame to house the catalyst elements, each of the catalyst elements being shaped in stairs-like by alternately forming flat plate portions and level-changing portions therein, in each of the catalyst elements, the angle formed between the line which connects corresponding vertexes of adjacent level-changing portions in a catalyst element and the flat surface in the level-changing portion being less than 90°, the catalyst elements being stacked so that adjoining catalyst elements are contacted with each other at least at a vertex of a catalyst element, and the catalyst elements forming gas flow passages having a rectangular or rhombic cross section between the adjoining catalyst elements.

(13) The catalyst structure for purifying an exhaust gas recited in paragraph (12) above wherein the catalyst elements are housed with both ends in the direction in which the flat plate portions and level-changing portions are formed in a line being level-changing portions.

(14) The catalyst structure for purifying an exhaust gas recited in paragraph (12) or (13) above wherein the angle formed between the flat surface of the level-changing portion at the ends of the catalyst element and the line which directly connects the vertex of the level-changing portions being 90°.

(15) The catalyst structure for purifying an exhaust gas recited in any one of paragraphs (12) to (14) above wherein the catalyst elements are formed by applying a catalyst component containing at least two metals selected from the group consisting of titanium, vanadium, molybdenum, and tungsten to a metallic, ceramic, or glass netlike substrate so that the catalyst component is filled in the meshes of the netlike substrate.

(16) The catalyst structure for purifying an exhaust gas recited in any one of paragraphs (12) to (15) above wherein the catalyst elements are stacked through a metallic, ceramic, or glass netlike member interposed therebetween and having a large number of perforated holes.

(17) The catalyst structure for purifying an exhaust gas recited in paragraph (16) above wherein the netlike member interposed between the catalyst elements is a wire cloth, or a woven fabric of ceramic or glass fibers.

(18) The catalyst structure for purifying an exhaust gas recited in paragraph (16) or (17) above wherein the diameter of the wires or fibers in the wire cloth, or woven fabric of ceramic or glass fibers, in the direction perpendicular to the direction of gas flow is larger than the diameter of the wires or fibers in the direction along the direction of the gas flow.

(19) The catalyst structure for purifying an exhaust gas recited in any one of paragraphs (16) to (18) wherein the ceramic or glass fiber woven fabric is reinforced by impregnating it with an inorganic binding material.

(20) The catalyst structure for purifying an exhaust gas recited in paragraph (17) or (18) above wherein a catalyst component containing at least one metal selected from the group consisting of titanium, vanadium, molybdenum, and tungsten is supported on the surface of the wire cloth, or woven fabric of ceramic or glass fibers.

(21) An apparatus for purifying an exhaust gas comprising the catalyst structure defined in any one of paragraphs (1) to (6), and (12) to (20) above placed in an exhaust gas flow passage.

(22) A process for purifying an exhaust gas by using the apparatus for purifying an exhaust gas recited in paragraph (21) above.

(23) A process for purifying an exhaust gas comprising decomposing and removing nitrogen oxides in an exhaust gas by using the apparatus for purifying an exhaust gas defined in paragraph (21) above.

BEST MODE FOR CARRYING OUT THE INVENTION

Now, the present invention will be described in more detail with reference to drawings.

Figure 1:
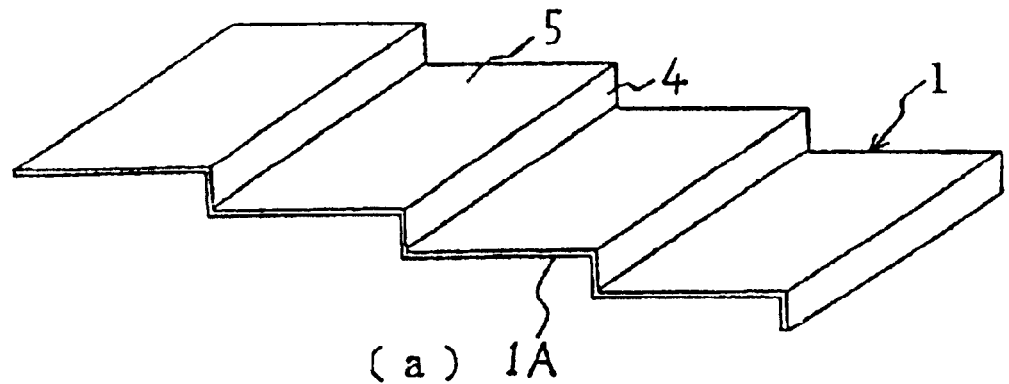
FIG. 1(*a*) is a perspective view of a catalyst element of the present invention, and FIG. 1(*b*) is a cross-sectional view of the catalyst structure obtained by stacking two or more of the catalyst elements.
Figure 1:
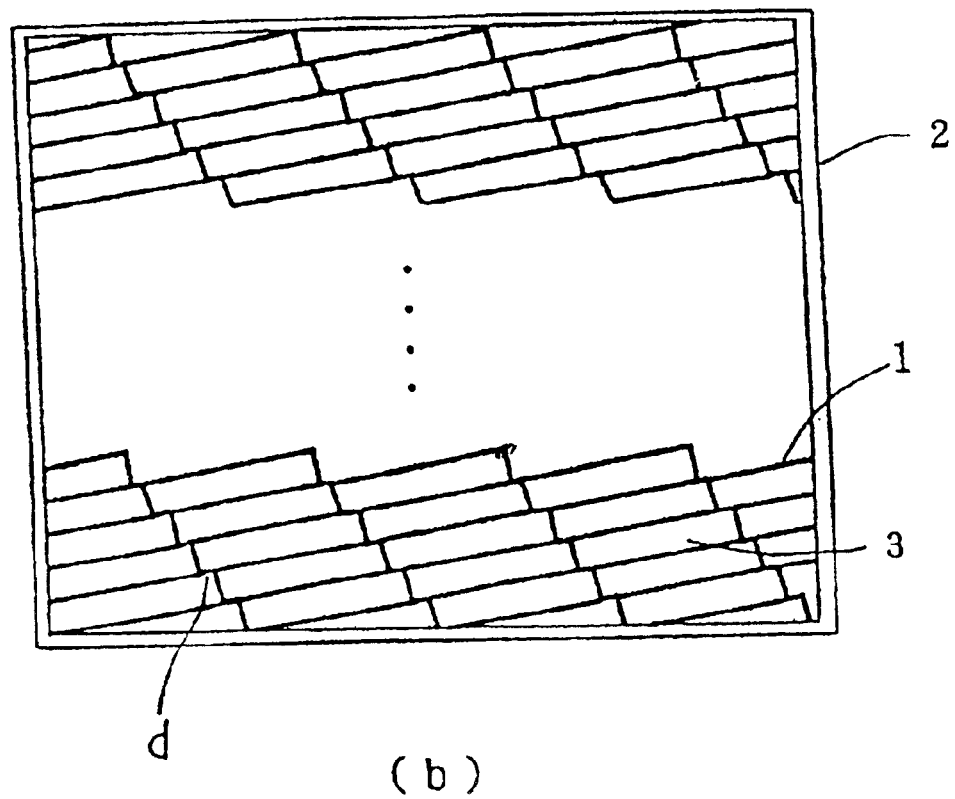

As shown in FIG. 1(*a*), a catalyst element 1 of the present invention is produced by supporting a catalyst component with a substrate on its surface, and repeatedly forming flat plate portions 5 and level-changing portions 4 alternately at an interval into a stairs-like. As shown in FIG. 1(*b*), two or more catalyst elements 1 are stacked in a frame 2 to form a catalyst structure having a space which becomes gas flow passage 3.

Figure 2:
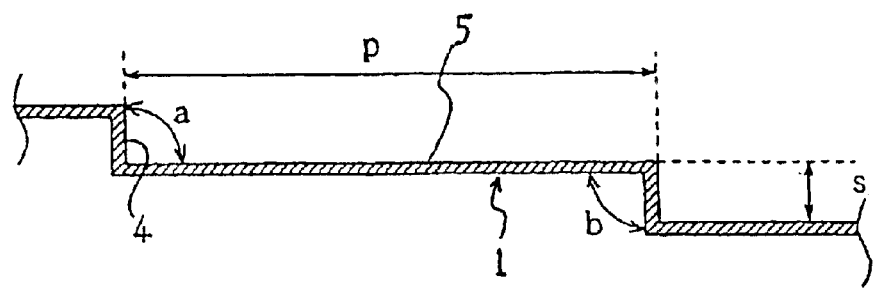
FIG. 2 is a diagram showing measurements of a catalyst element of the present invention.

As will be seen from FIG. 1(*a*), level-changing portions 4 in catalyst element 1 are formed by bending opposite directions a rectangular or square plate-like substrate at a predetermined interval in the direction parallel to that of a pair of sides 1A. As shown in FIG. 2, angle a and angle b of bending at the level-changing portions in opposite directions become the same or about the same. In this connection, the bending angle a and bending angle b may theoretically be any value, but they are preferably an obtuse angle close to 90° in usual cases. Length p of flat plate portions and the height s of level-changing portions may be the same, but it is advantageous to select a larger value for the length p than the height s, since a catalyst structure having a smaller number of corner portions which are formed at the places where adjoining catalyst elements 1 are contacted with each other when catalyst elements are stacked can be obtained and thus deposition of dust can be prevented.

While any value may be selected for the height s of the level-changing portions, this value determines the stacking space (pitch) between catalyst elements. Accordingly, for a catalyst element in which the angle a is around 90° used for purifying an exhaust gas, the space is selected generally in smaller than 10 mm and preferably about 6 to about 3 mm.

While it depends on the height of level-changing portions and the interval between level-changing portions, the length d where adjoining catalyst elements lie one upon another when they are stacked is usually less than ½ of the height s of level-changing portions and preferably 2 to 5 mm in practical use.

In the present invention, a catalyst structure as shown in FIG. 1(*b*) can be obtained by arranging adjoining catalyst elements with the position of level-changing portions being shifted between adjoining catalyst elements by a predetermined length d in turn. While several methods are available for such method, a catalyst structure in which the position of level-changing portions are regularly shifted is obtained when catalyst elements 1 are produced according to the following methods:

① Plate-like material for a catalyst element is cut to a predetermined length in advance, and formed into catalyst elements so that the length of flat plat portions p becomes an integral multiple of the height s of level-changing portions and the position of level-changing portions are each shifted by an integral multiple of the height s of level-changing portions.

Figure 3:
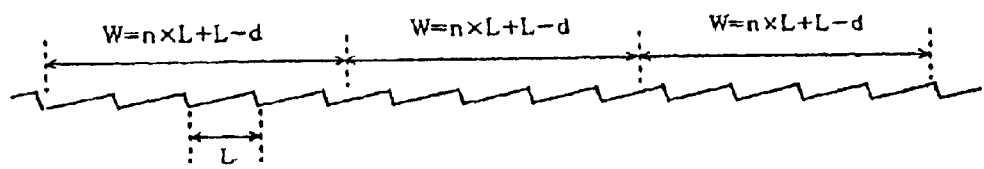
FIGS. 3 and 4 are diagrams for illustrating a process for producing a catalyst element of the present invention.

② Predetermined length of flat plate portions and a predetermined height of level-changing portions are continuously formed in a flat belt-shaped substrate for a catalyst element, and then the flat plate portions are cut in turn such that the following relation is established between the whole length W of each of the cut catalyst elements and the distance L between adjacent level-changing portions in each of the elements as shown in FIG. 3:

$$W = n \times L + L - d \tag{1}$$

wherein n represents the number of the level-changing portions per one sheet of the element, and d represents a length d (constant) which is smaller than L but larger than 0.

By this method, a large number of catalyst elements 1 can readily be obtained.

As described above, such a catalyst structure as shown in FIG. 1(*b*) can readily be obtained by selecting the whole length W and the distance L between two adjacent level-changing portions, recurrently forming the level-changing portions, cutting the substrate each to a predetermined length w, and then stacking the cut substrates.

Figure 4:
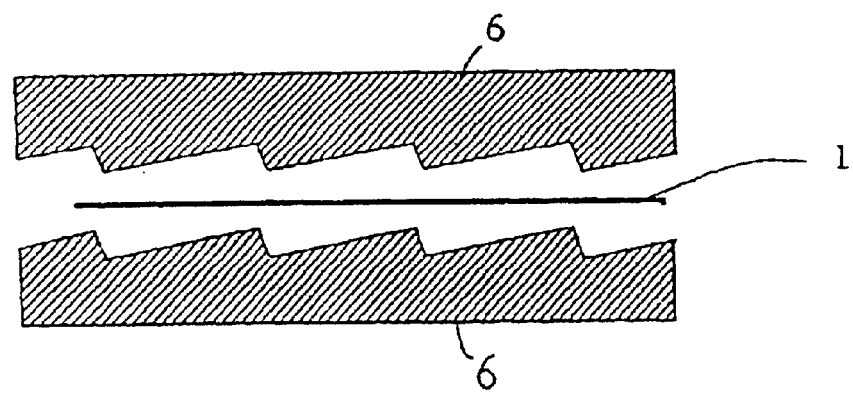

③ In an alternative method, when the whole length of catalyst element 1 after a predetermined length of flat plate portions and predetermined height of level-changing portions was decided to be W, catalyst elements can be produced by cutting material (substrate) 1' which is used for producing catalyst element 1 to such a length that the predetermined length W described above can be obtained, and then forming the cut materials into catalyst elements by using a mold 6 by which distance L can be formed as shown in FIG. 4 while shifting by a predetermined length d. By these procedures, catalyst element 1 which satisfies the relation of the equation (1) described above can be obtained.

Such a catalyst structure as shown in FIG. 1(b) can readily be obtained by stacking in turn the catalyst elements 1 obtained by the method described ③ in frame 2.

While it is desirable that the length of all of the flat plate portions in the catalyst elements of the present invention is the same and the height of all of the level-changing portions in the catalyst elements are also the same, it is possible to make them in other dimensions unless the object of the present invention is defeated.

As the catalyst elements of the present invention, ones which are produced by applying a catalyst component to the surface of a ceramic netlike substrate or a netlike metallic plate such that the catalyst component is filled in the meshes are preferably used.

Catalyst elements of the present invention are obtained by making a substrate for a belt-shaped catalyst element support thereon a catalyst component having a catalytic activity before or after the belt-shaped substrate is cut into catalyst elements having a predetermined whole length.

Also, an apparatus for purifying an exhaust gas comprising the catalyst structure described above and placed in a exhaust gas flow passage so that the cross section of the stacked catalyst elements becomes a flow passage of an exhaust gas is included in the scope of the present invention.

Figure 6:
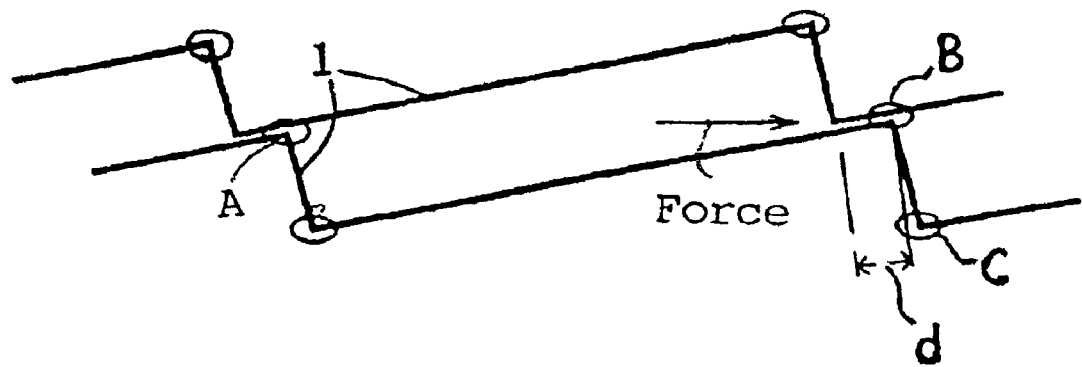
FIG. 6 is a diagram for illustrating a characteristic of the present invention.

In the present invention, adjoining catalyst elements are arranged to contact at least three points (A, B, and C) as shown in FIG. 6, and thus the catalyst structure becomes a shape by which a deformation by the force in the lateral direction shown in the Figure very hardly occurs.

Figure 5:
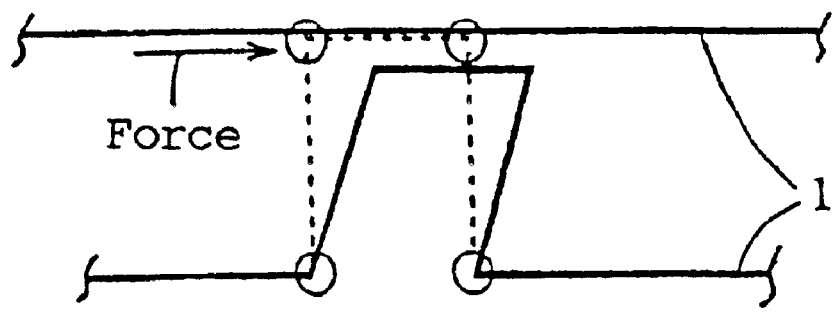
FIG. 5 is an auxiliary diagram for illustrating a problem of catalyst structures produced by the conventional technology.

In contrast thereto, conventional catalyst structures are readily deformed when a force in the lateral direction is applied (or exerted) as shown in FIG. 5 and thus the distance between adjoining catalyst elements, which forms a gas flow passage, becomes small. Accordingly, in conventional catalyst structures, a sufficient strength was unable to obtain.

In the catalyst structures of the present invention, gas flow passage 3 of a rectangular cross section is formed by combining catalyst elements 1, which hardly cause deformation by the force in the lateral direction, as basic unit as shown, for example, in FIG. 1(b). Therefore, the catalyst structures of the present invention are very strong, do not produce gaps due to lowering of compression between adjoining catalyst elements even when used for a long period of time, and do not cause such a problem as vibration by the gas flow. The catalyst structures of the present invention are stable particularly to vibration.

Further, in the catalyst structures of the present invention, the cross section of gas flow passages formed between the catalyst elements in the structures is rectangular. Accordingly, the number of corner portions which become a cause of dust deposition can remarkably be reduced by selecting a sufficiently larger length of the long side in the rectangle than that of the short side. Thus, in the catalyst structures of the present invention, dust is very hardly deposited compared with conventional honeycomb-shaped catalyst structures. Therefore, the catalyst structures of the present invention can be used at a smaller pitch even in the uses wherein dust concentration is high, and provide compact denitration apparatuses.

Figure 15:
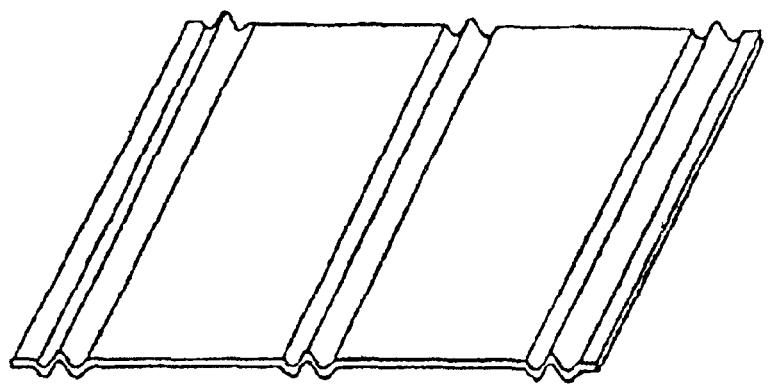
FIGS. 15(*a*) and (*b*) are diagrams showing another catalyst element produced by the conventional technology and a stacked condition thereof, respectively.
Figure 15:
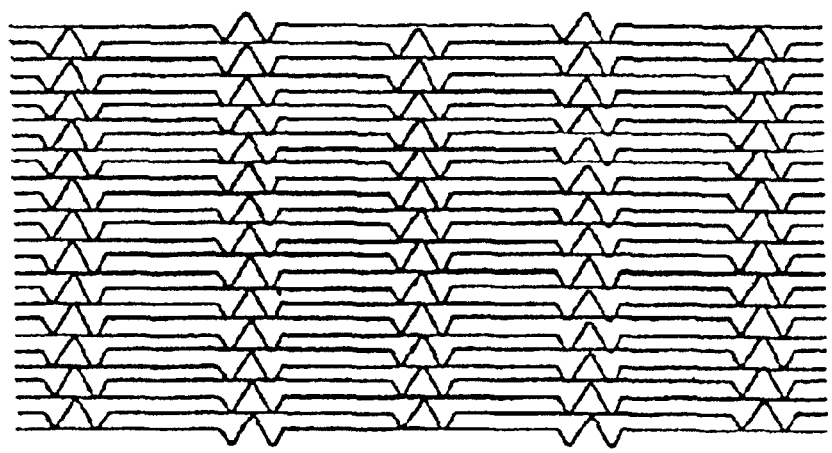
Figure 16:
FIGS. 16(*a*), (*b*), (*c*) are diagrams showing still other examples of catalyst structures produced by the conventional technology.
Figure 16:
Figure 16:

In the catalyst structures of the present invention, gas flow passages formed between catalyst elements 1 are simple as shown in FIG. 1(b) compared with gas flow passages in conventional technology as shown, for example, in FIG. 15(b), and thus blow away of the gas does not occur. Besides, there is not a case where gas flow speed locally becomes high. Accordingly, the catalyst structures of the present invention do not locally wear even if such a gas containing a large amount of smoke dust as a coal exhaust gas was passed.

Further, an unreasonable stress is not applied when catalyst elements 1 are formed because the shape of the level-changing portions 4 formed in each of the substrates for catalyst elements is simple in the catalyst structures of the present invention as shown in FIG. 1(a) and the elements are produced by forming plate-like substrates into a shape wherein the plate-like substrates are alternately bent into right angle or an obtuse angle close thereto; and there is not a case where the elements are torn off or cause lowering in strength. Therefore, even thin catalyst elements can readily be formed according to the present invention. Since it is not necessary to form a complex shape in the present invention, it is possible to readily obtain catalyst structures in which the pitch between adjoining catalyst elements is narrow.

Figure 7:
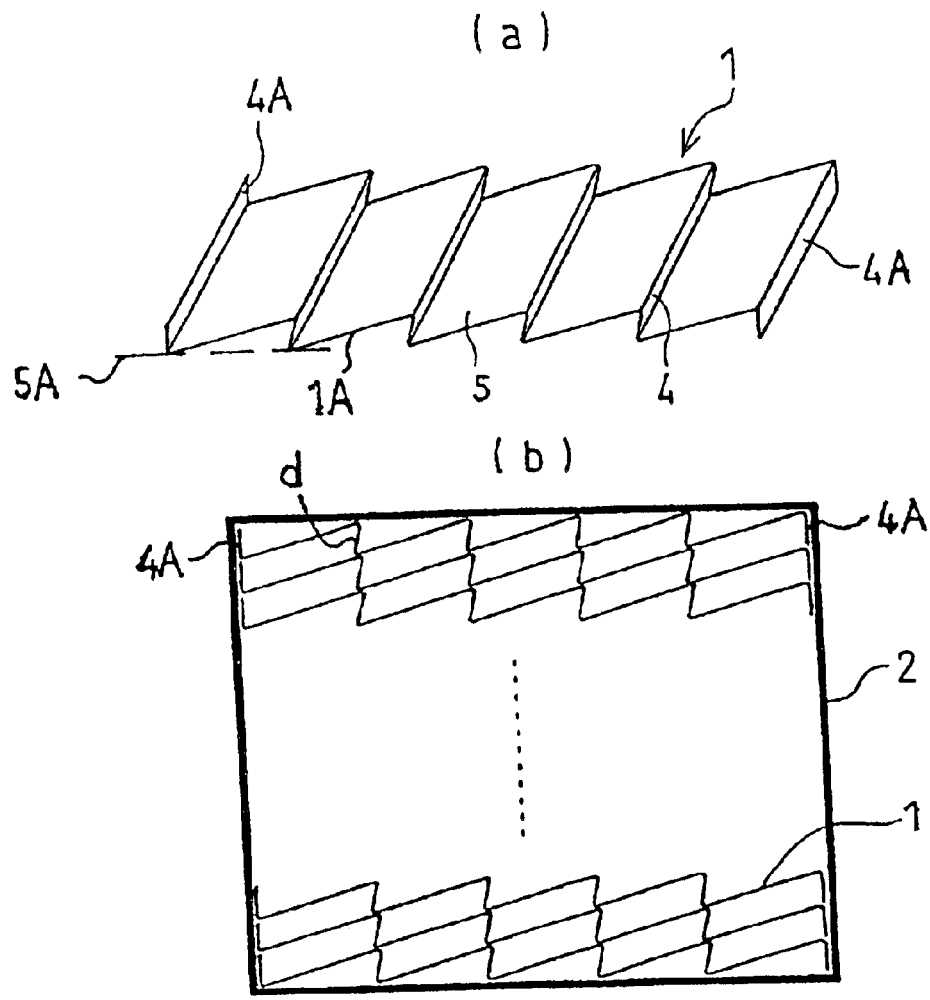
FIGS. 7(*a*) and (*b*) are diagrams showing another catalyst element of the present invention and the catalyst structure obtained by stacking two or more the catalyst elements, respectively.
Figure 8:
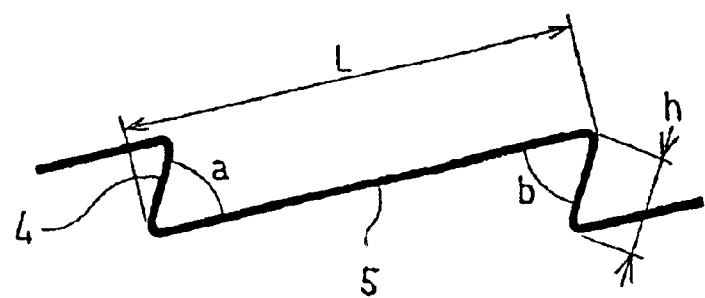
FIGS. 8 and 9 are partially enlarged cross-sectional views of other catalyst elements of the present invention.
Figure 9:
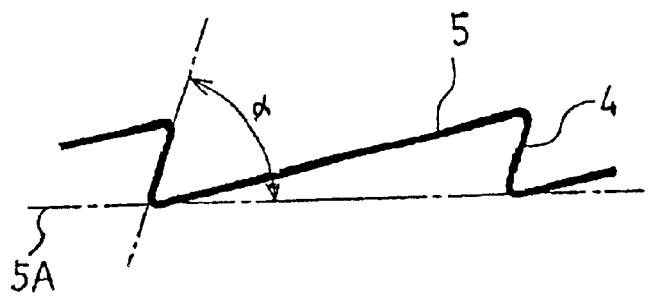

Next, FIGS. 7(a) and (b) are diagrams for illustrating the catalyst element and catalyst structure of a second embodiment of the present invention; and FIG. 8 and FIG. 9 illustrate the details of the catalyst elements. Catalyst elements in this embodiment of the present invention are produced by bending a rectangular or square plate on which a catalyst component is supported into a stairs-like shape in the direction parallel to that of the side 1A of a pair of sides at a predetermined interval to alternately form flat plate portions 5 and level-changing portions 4. Difference from the catalyst element shown in FIG. 1 is that the angles a and b formed between flat plate portions 5 and level-changing portions 4 are designed to be the same acute angle. Through such arrangement, it becomes possible to stack many catalyst elements of the same shape as shown in FIG. 7(b). In the catalyst elements of the present invention, the angle α formed between line 5A which connects corresponding vertexes of adjacent level-changing portions and the flat surface of level-changing portion 4 is selected to be smaller than 90°, preferably 60° to 90°, and more desirably 70° to 85° as shown in FIG. 9. While the angle α is varied according to the thickness of catalyst pitch and the pitch between catalyst elements, 70°, 80°, or 85° is selected in practical use.

In the catalyst elements of the present invention, level-changing portions 4 are provided at both ends of flat plate portions 5 along the direction in which the flat plate portions and level-changing portions are arranged in a line as shown in FIG. 7(a); and the angle α formed between the flat surface portions of level-changing portions 4 at the both ends and the line 5A described above which connects corresponding vertexes of adjacent level-changing portions is made to an angle conforming to a frame, usually 90°.

Specifically, the catalyst elements of the present invention are produced by forming plate-like catalysts which were prepared by applying a catalyst component to a metallic substrate, ceramic substrate, or the like, into integrated products alternately having level-changing portions 4 and flat plate portions 5 as shown in FIG. 7(a) by using a pressing device provided with heating means. As the device provided with heating means, for example, a machining implement such as a roller press and flat press can be mentioned.

Dimensions for forming may basically be any measure, the thickness is 0.5 to 2 mm, the length L of flat plate portions is 20 to 100 mm, and the height h of level-changing portions is 2 to 10 mm in ordinary catalysts for purifying an exhaust gas as shown in FIG. 8.

One of the characteristics of the second embodiment of the present invention described above is that the catalyst structures are constructed by a method which is an improvement of that in the first embodiment of the present invention (FIGS. 1 (a), (b)) wherein two or more kind of catalyst elements having different ends are used. Specifically, catalyst elements having the same shape are used in the second embodiment.

Figure 10:
FIGS. 10(*a*) and (*b*) are diagrams showing stacked conditions of catalyst elements in the present invention.
Figure 10:
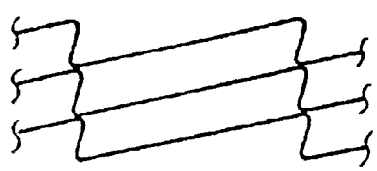

FIG. 10(a) is a diagram showing the condition wherein catalyst elements in which the angle α formed between the line which connects corresponding vertexes of adjacent level-changing portions and the flat surface of level-changing portions is larger than 90° are stacked such that overlapping portion d (cf. FIG. 6) becomes 0 in the first embodiment of the present invention. On the other hand, FIG. 10(b) is a diagram showing the condition wherein two or more catalyst elements in which the angle α described above is smaller than 90° are stacked in the second embodiment of the present invention. In the case of FIG. 10(a), it is necessary to stack catalyst elements while overlapping an upper catalyst element and a lower catalyst element by a certain length at vertex portions so that the position of each catalyst element is shifted by length d in order to form stabilized catalyst structures. Accordingly, it is necessary to prepare catalyst elements of different shapes as shown in FIG. 1(b) in order to assemble catalyst elements into a unit of predetermined dimensions. In the second embodiment of the present invention shown in FIG. 7(b), however, it is possible to maintain a certain overlapping portion d at the points where adjoining catalyst contacts each other and thus catalyst structures can be formed only from catalyst elements of the same shape even when a large number of catalyst elements are stacked up and down without shifting, by making the angle α smaller than 90°. Accordingly, the productivity of catalyst structures in the second embodiment of the present invention is considerably increased compared with the first embodiment shown in FIGS. 1(a) and (b).

While the overlapping portion d described above in the second embodiment of the present invention may be line contact, it is usually less than ½ of the height of level-changing portions in the same manner as in the first embodiment described above, and preferably 2 to 5 mm in practical use.

Further, the angle α formed between the flat surface 4A of level-changing portions at both ends and line 5A connecting corresponding vertexes of adjacent level-changing portions is made 90° in the catalyst element of FIG. 7(b). Based on this arrangement, the flat surface 4A of level-changing portions positioned at the ends of a catalyst element act as a spacer for preventing a catalyst element from contacting with an adjoining element at the ends, and the 4A of level-changing portion described above can support the catalyst's own weight as a face. According to the present invention, disorder in distance between catalyst elements at the ends of catalyst elements described above, and insufficient strength caused by the fact that the contact of ends of catalyst elements and catalyst frame is line contact are resolved, and damage of catalyst elements can be prevented.

As described above, a second embodiment of the present invention improves the first embodiment described above, and achieve such effect that pressure loss and deposition of dust are small since the cross section of gas flow passages in catalyst structures become close to rectangle in the same manner as in the first embodiment, that blow away and difference in flow speed of a gas come to hardly occur since the number of contact points between catalyst elements and catalyst area which become ineffective are small, and the shape of gas flow passages becomes uniform, and thus that catalyst performances are remarkably improved.

Catalyst structures of the present invention can be constructed by assembling catalyst elements of the first or second embodiment of the present invention comprising the flat plate portions and level-changing portions described above through flat netlike products.

In the present invention, catalyst elements are produced by applying a catalyst paste containing titanium oxide as main component, and one or more denitration active components of such oxides as those of vanadium, molybdenum, and tungsten to a catalyst substrate so that its meshes are filled by the paste, pressing the substrate, and then forming into a specific shape described above. In the catalyst paste, inorganic fibers and a bonding agent can be added.

As the catalyst substrate, a metallic substrate having perforations such as a wire cloth and metal lath, a woven fabric obtained by weaving yarns of inorganic fibers such as ceramic and glass fibers into a netlike structure, or a product prepared by impregnating or coating the woven fabric with an inorganic bonding agent to reinforce thereby to impart rigidity to the woven fabric is used. The catalyst substrate affords better results as the size of openings therein becomes larger in the range in which the strength of the substrate at the time of being stacked permits. The words "metal lath" in this specification means a metallic plate formed into a netlike product by forming a predetermined length of cuts in a metallic plate at a predetermined interval in a zigzag pattern, expanding the metallic plate in the direction perpendicular to that of the cuts by a predetermined force to make a large number of perforations (small through holes) formed by deformation of the cuts.

As the netlike product described above, a material prepared by supporting or coating a catalyst component on the surface of a netlike product of metallic fibers or inorganic fibers such that the perforations of the meshes are not clogged can be used.

Figure 12:
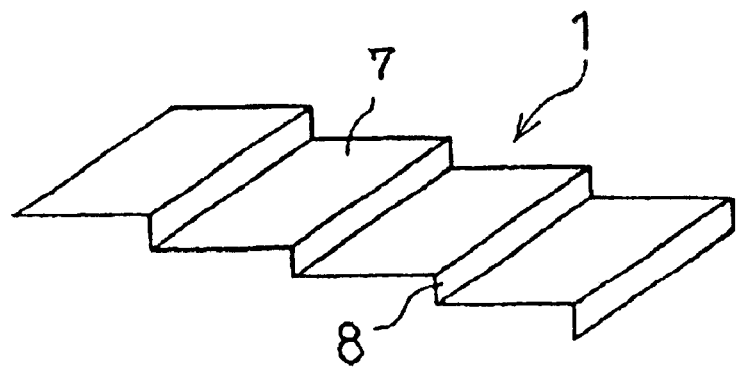
FIGS. 12(*a*), (*b*), and (*c*) are diagrams for illustrating an example in which netlike members are interposed between catalyst elements.
Figure 12:
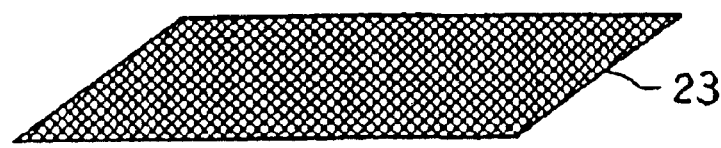
Figure 12:
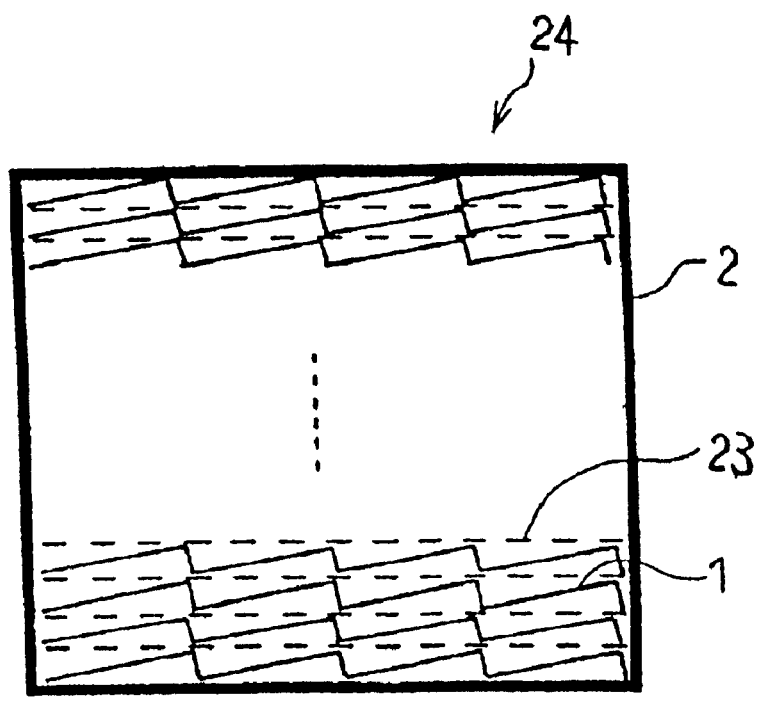

FIGS. 12(a), (b), and (c) are diagrams showing the catalyst structure produced by stacking catalyst elements 1 used in the present invention through netlike product 23. In the FIG. 12(c), catalyst structure 24 comprising a large number of catalyst elements 1 having flat plate portions 7 and level-changing portions 8, and netlike products 23 stacked alternately and housed in frame 2 is shown.

According to the catalyst structure described above, a gas agitating effect by the netlike product is developed, and thus catalyst reaction efficiency is increased. In general, in catalyst structures in which gas flow passages are formed in the direction parallel to that of a gas flow, the gas which flows in the passages forms a laminar flow, and the speed at which objective components in the center portion of the flow passages diffuse to the surface of the catalyst becomes remarkably slow. In contrast to such structures, since netlike products are arranged in the catalyst structures of the present invention described such that the netlike products go across the center portion in the gas flow passages, where gas diffusion speed becomes slow, the gas flow at the center portion is disturbed by Kármán's vortexes formed by projections and depressions on the surface of the netlike products or the netlike products themselves. Accordingly, diffusion of objective components to the catalyst surface is greatly increased. Hence, in the present invention, an extremely high catalyst performances can be obtained even by the same amount of catalyst.

Figure 13:
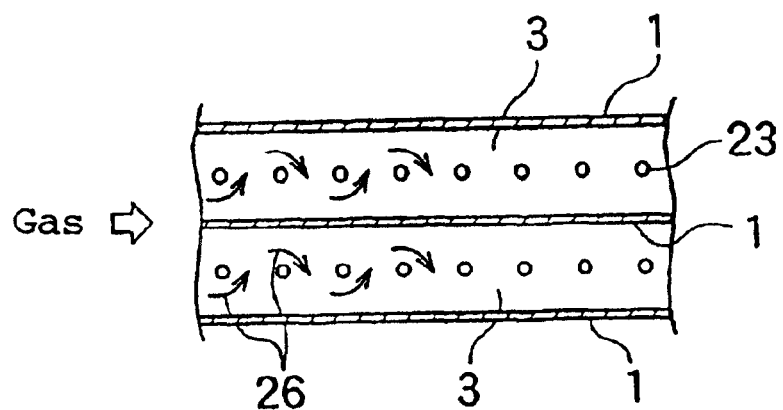
FIG. 13 is a partial cross-sectional view for illustrating a function in the present invention.
Figure 14:
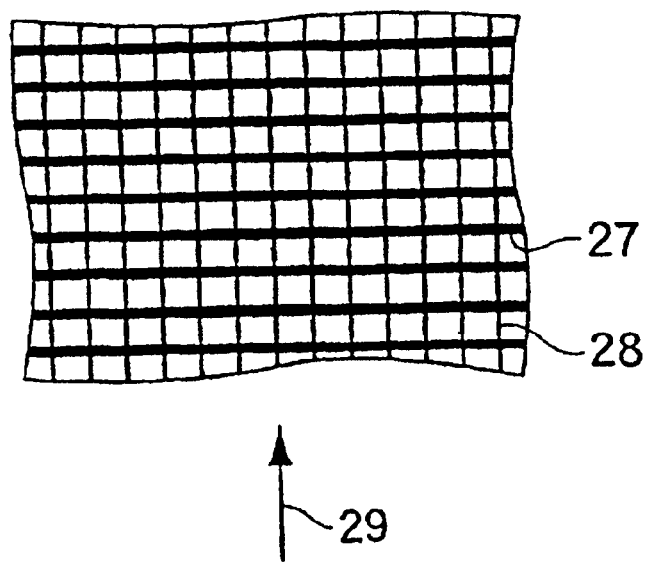
FIG. 14 is a diagram showing the relation between the diameter of fibers arranged longitudinally or laterally in a woven fabric used in the present invention and the direction of gas flow, respectively.

FIG. 13 is a schematic diagram showing a part of cross section of the catalyst structure of FIG. 12(c) in the direction parallel to that of gas flow. In the Figure, gas flow passages 3 are formed between catalyst elements 1. At the center portion of gas flow passages 3, netlike products 23 are placed and Kármán's vortexes 26 of an exhaust gas are formed by the netlike products 23.

When woven fabrics of ceramic or glass fibers, or wire clothes are employed as netlike product used in the present invention, it is preferable to use woven fabrics of ceramic or glass fibers, or wire clothes in which the diameter of the fibers or wires 27 (hereinafter simply referred to as fiber diameter) in the direction perpendicular to the gas flow direction, that is the direction 29 to which the gas flows is larger than the fiber diameter 28 along the gas flow direction. By this arrangement, gas flow is disturbed to promote catalyst reaction, and increase of pressure loss due to deformation of gas flow passage is suppressed and gas supply cost can be reduced since the strength of catalyst structures is increased.

In the present invention, better results can be obtained in the strength of catalyst structures and catalyst performances as the size of the fibers or wires which are placed in the direction perpendicular to that of gas flow in the woven fabrics or wire clothes disposed between catalyst elements when the elements are stacked becomes larger, unless the openings in the woven fabrics or wire clothes which are used for disturbing gas flow in the vicinity of the fabrics or clothes are clogged. On the other hand, better results can be obtained as the size of the fibers or wires placed in the direction parallel to that of the gas flow becomes smaller, if it is in the range wherein the strength of catalyst elements at the time when they are stacked is secured.

In the present invention, woven fabrics disposed between catalyst elements are prepared by weaving twisted yarns of inorganic fibers such as ceramic fibers and glass fibers into netlike products. Method of weaving is not specifically limited, but plain weaving, skipped plain weaving, or leno weaving is generally used, and leno weaving provides a preferable result in the aspect of strength. Woven fabrics are preferably reinforced with an inorganic bonding agent including silica and titania to impart rigidity.

In the present invention, it is preferable to support or coat a catalyst component on the surface of woven fabrics or wire clothes disposed between catalyst elements to such an extent that the perforations existing in the meshes of the woven fabrics or wire clothes are not clogged. Catalyst component contains, for example, titanium oxide, and one or more oxides of vanadium, molybdenum, or tungsten. Woven fabrics or wire clothes afford better results as the size of openings therein become larger in the range wherein the strength of catalyst elements at the time of being stacked permits.

The present invention will be described below in more detail with reference to specific Examples.

EXAMPLE 1

Catalyst substrates were obtained by impregnating netlike products prepared by plain weaving twisted yarns each of 1400 E glass fibers having a fiber diameter of 9 $\mu$m at a density of 10 yarns/25.4 mm with a slurry containing 40% of titania, 20% of silica sol, and 1% of polyvinyl alcohol, and then drying at 150° C. to impart a rigidity.

On the other hand, 25 kg of ammonium paramolybdate $((NH_4)_6 \cdot Mo_7O_{24} \cdot 4H_2O)$, 23 kg of ammonium metavanadate $(NH_4VO_3)$, and 30 kg of oxalic acid were added to 120 kg of titanium oxide having a specific surface area of 270 m$^2$/g in a separate step, a silica sol of 20% by weight was further added thereto in an amount of 8% by weight in terms of $SiO_2$, and then the mixture was kneaded while adding water to form a paste. To the paste was added 30 kg of kaolin type inorganic fibers (produced by Isolite Insulating Products Co., Ltd.; trade name Kaowool) and further kneaded to obtain a paste having a water content of 30.5%.

After the paste thus obtained was placed between two sheet of the substrates of 500 mm wide prepared by the previous procedures, and applied on the surface of the netlike product and in the meshes thereof by pressing them with a pair of press rolls, the substrates were cut to a length of 480 mm to obtain plate-like catalyst elements of 1.1 mm thick. Subsequently, each of the catalyst elements was inserted in mold 6 (FIG. 4) having portions which correspond to the level-changing portions shown in FIG. 2, and pressed by the mold while being heated to dry thereby to form level-changing portions.

In this case, the shape of the catalyst elements formed was as follows:

Length p of flat plate portions was 44 mm, the height s of level-changing portions was 4 mm, the angle formed between flat plate portions and level-changing portions was 90° (FIG. 2), and the position where level-changing portions were formed was shifted by a distance d of 4 mm in turn for every catalyst element.

The catalyst elements thus obtained were assembled in a metal frame and calcined while being ventilated at 500° C. for 2 hours to obtain a catalyst structure as shown in FIG. 1(b).

EXAMPLE 2

Ammonium paramolybdate $((NH_4)_6 \cdot Mo_7O_{24} \cdot 4H_2O)$ in an amount of 2.4 kg and 1.28 kg of ammonium metavanadate $(NH_4VO_3)$ were added to 67 kg of a slurry of metatitanic acid ($TiO_2$ content: 30% by weight, $SO_4$ content: 8% by weight) and kneaded by using a heating kneader while evaporating water to obtain a paste containing about 36% of water. Subsequently, this paste was extruded into a rod-like material of 3 $\phi$, pelletized, dried in a fluidized drier, and then calcined in the atmosphere at 250° C. for 2 hours. The pellets thus obtained were ground with a hammer mill into powders having an average diameter of 5 $\mu$m to obtain a first component. Ratio of each component V/Mo/Ti in the powders at this time was 4/5/9 (atomic ratio). The powders thus obtained in an amount of 20 kg, 3 kg of $Al_2O_3SiO_2$ type inorganic fibers, and 10 kg of water were kneaded by using a kneader for 1 hour to make them paste-like. This catalyst paste was applied on the surface of SUS304 metal lath substrates having a width of 490 mm and a thickness of 0.2 mm and in the meshes thereof by using a roller press to obtain a plate-like catalyst of 0.9 mm thick. The flat plate-like substrates for catalyst elements were formed in turn with press mold 6 having portions corresponding to the flat plate portions having a length p of 64 mm and seven portions corresponding to the level-changing portions having a height s of 6 mm. In this case, the substrates were formed into catalyst elements while the position where the level-changing portions to be formed being shifted by 6 mm in turn for every substrate. The catalyst elements thus obtained were assembled in a metal frame and calcined while being ventilated at 500° C. for 2 hours to obtain a catalyst structure as shown in FIG. 1(b).

COMPARATIVE EXAMPLE 1

After wave-shaped catalyst elements having about the same dimensions as those of the catalyst elements in Example 1 were formed, a catalyst structure was obtained in the same manner as in Example 1 with the exception that the wave-shaped catalyst elements described above were stacked while the direction of the upper and lower sides thereof was alternately changed as shown in FIG. 15(b).

COMPARATIVE EXAMPLE 2

After wave-shaped catalyst elements having about the same dimensions as those of the catalyst elements in Example 2 were formed, a catalyst structure was obtained in the same manner as in Example 2 with the exception that the wave-shaped catalyst elements described above were stacked while the direction of the upper and lower sides thereof was alternately changed as shown in FIG. 15(b).

Pressure loss and denitration ratio were determined for each of the catalyst structures of Example 1, Example 2, Comparative Example 1, and Comparative Example 2 under conditions shown in Table 1. The result thus obtained are shown in Table 2.

TABLE 1

| Item | Numerical value |
| --- | --- |
| Exhaust gas temperature (° C.) | 350 |
| Exhaust gas flow rate (m/h) | 7 |
| AV (catalyst area rate) (m/h) | 34 |
| Type of exhaust gas | LPG combustion exhaust gas |
| $NO_x$ concentration (ppm) | 80 |
| $NH_3$ concentration (ppm) | 96 |

TABLE 2

| Catalyst | Pressure loss (mm $H_2O$/m) | Denitration ratio (%) |
| --- | --- | --- |
| Example 1 | 45 | 94 |
| Example 2 | 16 | 93 |
| Comparative Example 1 | 58 | 89 |
| Comparative Example 2 | 21 | 86 |

From these results, it can be understood that the catalyst structures of the present invention are small in pressure loss and high in denitration ratio compared with conventional catalyst structures. In the catalyst structures of Comparative Examples, effective cross sectional area of gas flow passages is reduced to increase pressure loss and gas flow rate is increased at wave portions in the vicinity of mountain (vertex) portions at the same time, since a complex wave-shaped structure is employed as spacer, and thus only a low denitration ratio is obtained. In the contrast thereto, a high denitration ratio can be obtained by the catalyst structures of the present invention since the shape of gas flow passage therein is approximately rectangle.

Besides, the catalyst structures of the present invention are excellent even in strength compared with that of Comparative Examples. When the catalyst in Example 1 in which glass fiber substrates were used and the catalyst in Comparative Example 1 was compared in particular, it can be seen that the catalyst structure of the present invention brings about the result that deformation of the structure caused by compression and disturbance of the shape of gas flow passages are small.

EXAMPLE 3

Catalyst substrates were obtained by impregnating netlike products prepared by leno weaving twisted yarns each of 1000 E glass fibers having a fiber diameter of 9 μm at a density of 10 yarns/25.4 mm with a slurry containing 40% of titania, 20% of silica sol, and 1% of polyvinyl alcohol, and then drying at 150° C. to impart rigidity.

On the other hand, 25 kg of ammonium paramolybdate $((NH_4)_6 \cdot Mo_7O_{24} \cdot 4H_2O)$, 23 kg of ammonium metavanadate $(NH_4VO_3)$, and 30 kg of oxalic acid were added to 120 kg of titanium oxide having a specific area of about 270 $m^2$/g in a separate step, a silica sol of 20% by weight was further added thereto in an amount of 8% by weight in terms of $SiO_2$, and then the mixture was kneaded while adding water to form a paste. To the paste was added 30 kg of kaolin type inorganic fibers (trade name: Kaowool) and further kneaded to obtain a paste having a water content of 30.5%.

After the paste thus obtained was placed between two sheet of the substrates of 500 mm wide prepared by the previous procedures, and applied on the surface of the netlike product and in the meshes thereof by pressing them with a pair of press rolls to obtain a band-shaped catalyst of 0.6 mm thick. The band-shaped catalyst thus obtained was passed through a pair of heated press rolls having the stairs-like shape as shown in FIG. 2 in which p is 35 mm, s is 3 mm, and a is 100° to continuously form the level-changing portions therein. Subsequently, the band-shaped formed product thus obtained was cut to a length of 487 mm in turn.

The catalyst elements thus obtained were assembled in a metal frame and calcined while being ventilated at 500° C. for 2 hours to obtain a catalyst structure as shown in FIG. 1(b).

COMPARATIVE EXAMPLE 3

Whereas an experiment for preparing a catalyst structure from catalyst elements having a shape homologous to that of the catalyst elements in Comparative Example 1 and having a mountain height of 3 mm was conducted, a catalyst structure having a high strength was unable to produce due to the cutting of glass fiber screens and a low strength of the elements after forming.

As described above, according to the present invention, catalyst structures having rectangular gas flow passages of a high strength can be obtained by using plate-like catalyst elements. The catalyst structures of the present invention make it possible to provide exhaust gas purifying apparatuses which are small in pressure loss and excellent in denitration performances. Besides, catalyst structures having a high strength can be obtained even when the thickness of catalyst elements and the pitch between catalyst elements are small according to the present invention, since the catalyst structures of the present invention have a simple shape. Based on these facts, apparatuses which are compact and can purify exhaust gases of a high flow rate can be actualized according to the present invention.

Further, according to the present invention, gas flow passages in catalyst structures are not clogged by dust since the number of corners where smoke/dust in exhaust gases is apt to deposit in catalyst structures is small. Accordingly, apparatuses for purifying exhaust gases employing the catalyst structure of the present invention can stably be operated for a long period of time as apparatus for denitrating exhaust gases from boilers which burn a heavy oil or coal.

EXAMPLE 4

Catalyst substrates having a rigidity were obtained by impregnating netlike product prepared by plain weaving twisted yarns each of 1400 E glass fibers having a fiber diameter of 9 μm at a density of 10 yarns/25.4 mm with a slurry containing 40% of titania, 20% of silica sol, and 1% of polyvinyl alcohol, and then drying at 150° C. to obtain catalyst substrates having a rigidity.

On the other hand, 0.25 kg of ammonium paramolybdate (($NH_4$)$_6$·$Mo_7O_{24}$·$4H_2O$), 0.23 kg of ammonium metavanadate ($NH_4VO_3$), and 0.3 kg of oxalic acid were added to 1.2 kg of titanium oxide having a specific surface area of 270 $m^2$/g in a separate step, a silica sol of 20% by weight was further added thereto in an amount of 8% by weight in terms of $SiO_2$, and then the mixture was kneaded while adding water to form a paste. To the paste was added kaolin type inorganic fibers (trade name Kaowool) and further kneaded to obtain a paste having a water content of 30.5%.

After the paste thus obtained was placed between two sheet of the substrates of 500 mm wide prepared by the previous procedures, and applied on the surface of the netlike product and in the meshes thereof by pressing them with a pair of press rolls, the substrates were cut to a length of 480 mm to obtain plate-like catalyst substrates of 0.7 mm thick for catalyst elements. Subsequently, each of the substrates was inserted in a mold for forming catalyst elements having level-changing portions as shown in FIG. 7(a), and pressed while being heated to dry to form level-changing portions. In this case, the shape of the catalyst elements formed was as follows:

Length p of flat plate portions was 44 mm, the height s of level-changing portions was 4 mm, the angle α formed between flat surface portions 4A in level-changing portions at both ends and the line which connects corresponding vertexes of adjacent level-changing portions was 90°, and the angle α formed between flat surface portions in level-changing portions at the portions other than edge positions and the line which connects the vertexes was 70° (FIG. 9).

The catalyst elements thus obtained were assembled in a metal frame and calcined while being ventilated at 500° C. for 2 hours to obtain a catalyst structure as shown in FIG. 7(b).

EXAMPLE 5

Ammonium paramolybdate (($NH_4$)$_6$·$Mo_7O_{24}$·$4H_2O$) in an amount of 2.4 kg and 1.28 kg of ammonium metavanadate ($NH_4VO_3$) were added to 67 kg of a slurry of metatitanic acid ($TiO_2$ content: 30% by weight, $SO_4$ content: 8% by weight) and kneaded by using a heating kneader while evaporating water to obtain a paste containing about 36% of water. Subsequently, this paste was extruded into a rod-like material of 3 φ, pelletized, dried in a fluidized drier, and then calcined in the atmosphere at 250° C. for 2 hours. The pellets thus obtained were ground with a hammer mill into powders having an average diameter of 5 μm to obtain a first component. Ratio of each component V/Mo/Ti in the powders at this time was 4/5/9 (atomic ratio).

The powders thus obtained in an amount of 20 kg, 3 kg of $Al_2O_3$·$SiO_2$ type inorganic fibers, and 10 kg of water were kneaded by using a kneader for 1 hour to make them paste-like. This catalyst paste was applied on the surface of SUS304 metal lath substrates having a width of 490 mm and a thickness of 0.2 mm and in the meshes thereof by using a roller press to obtain a plate-like catalyst substrates of 0.9 mm thick. The substrates were formed into catalyst elements in turn with a press mold designed to form catalyst elements having the length L of the flat plate portions of 64 mm, the height h of the level-changing portions of 6 mm (FIG. 8), the angle α formed between the flat surface portions 4A in level-changing portions at both ends and the line which connects corresponding vertexes of adjacent level-changing portions of 90°, and the angle α formed between the flat surface portions in level-changing portions at the portions other than the edge positions and the line which connects the corresponding vertexes of 80° (FIG. 9).

The catalyst elements thus obtained were assembled in a metal frame and calcined while being ventilated at 500° C. for 2 hours to obtain a catalyst structure as shown in FIG. 7(b).

COMPARATIVE EXAMPLE 4

Catalyst structure of Comparative Example 4 was prepared in the same manner as in Example 4 described above with the exception that the catalyst elements were stacked while the direction of the upper and lower sides was alternately changed as shown in FIG. 15(b) after substrates for catalyst elements were formed into wave-form having the same dimensions as those of the catalyst in the Example 4.

COMPARATIVE EXAMPLE 5

Catalyst structure of Comparative Example 5 was prepared in the same manner as in Example 5 described above with the exception that the catalyst elements were stacked while the direction of the upper and lower sides was alternately changed as shown in FIG. 15(b) after substrates for catalyst elements were formed into wave-form having the same dimensions as those of the catalyst in the Example 5.

Pressure loss and denitration ratio were determined for each of the catalyst structures of Examples 4 and 5, and Comparative Examples 4 and 5 under conditions shown in Table 3. The result thus obtained are shown in Table 4.

TABLE 3

| Item | Numerical value |
| --- | --- |
| Exhaust gas temperature (° C.) | 350 |
| Exhaust gas flow rate (m/s) | 7 |
| AV (catalyst area rate) (m/h) | 34 |
| Type of exhaust gas | LPG combustion exhaust gas |
| $NO_x$ concentration (ppm) | 80 |
| $NH_3$ concentration (ppm) | 96 |

TABLE 4

| Catalyst | Pressure loss (mm $H_2O$/m) | Denitration ratio (%) |
| --- | --- | --- |
| Example 4 | 44 | 96 |
| Example 5 | 17 | 94 |
| Comparative Example 4 | 58 | 89 |
| Comparative Example 5 | 21 | 86 |

From Table 4, it can be understood that the catalyst structures of Examples 4 and 5 are small in pressure loss and high in denitration ratio compared with those of Comparative Examples. That is, the catalyst structures of the Examples of the present invention are high in mechanical strength since the shape of cross section of gas flow passages is close to a rectangle, and besides the catalyst structures of the Examples have a large effective surface area. Accordingly, the catalyst structures of the present invention can make the pressure loss small. Further, the catalyst structures of the present invention can achieve a uniform distribution of exhaust gas flow rate and a high denitration ratio since the catalyst elements do not have such a complex shape as that in Comparative Examples. Besides, the catalyst structures of the present invention are excellent even in strength compared with those of Comparative Examples. When Example 4 in which glass fiber substrates were used and Comparative Example 4 was compared in particular, it can be seen that the catalyst structure of Example 4 brings about the result that deformation of the structure and disturbance of the shape of gas flow passages due to compression are small.

That is, the catalyst elements of Examples 4 and 5 can avoid damages even when, for instance, a glass fiber or metal lath substrate is used since their shape is simple. Further, catalyst structures having a high strength can be obtained even when the thickness of catalyst elements and the pitch between catalyst elements are small according to the present invention. Accordingly, the catalyst structures of the present invention can sufficiently cope with the demand of being compact and treating exhaust gases at a high flow rate.

EXAMPLE 6-1

Catalyst substrates were obtained by impregnating netlike products prepared by leno weaving twisted yarns each of 1000 E glass fibers having a fiber diameter of 9 $\mu$m at a density of 10 yarns/25.4 mm with a slurry containing 40% of titania, 20% of silica sol, and 1% of polyvinyl alcohol, and then drying at 150° C. to impart a rigidity.

Next, the paste obtained in Example 4 containing 30.5% of water was placed between two sheet of the substrates of 500 mm wide prepared by the previous procedures, and applied on the surface of the netlike products and in the meshes thereof by pressing them with a pair of press rolls to obtain a belt-shaped catalyst substrates of 0.6 mm thick. The substrates thus obtained were cut to a length of 480 mm and pressed with a pair of stairs-like heated molding press having dimensions and angles corresponding to a catalyst element having the length L of the flat plate portions 5 of 35 mm and the height h of the level-changing portions 4 of 3 mm (FIG. 8), the angle $\alpha$ formed between the flat surface portions 4A in level-changing portions at both ends and the line which connects vertexes of adjacent level-changing portions of 90°, and the angle $\alpha$ formed between the flat surface portions in level-changing portions at the places other than the ends and the line which connects the vertexes of 85° (FIG. 9) to form catalyst elements. The catalyst elements thus obtained were assembled in a metal frame and calcined while being ventilated at 500° C. for 2 hours to obtain a catalyst structure as shown in FIG. 7(b).

EXAMPLE 6-2

Catalyst elements similar to those of Example 6-1 were prepared in the same manner as in Example 6-1 with the exception that all of the angles $\alpha$ formed between all of the flat surface portions in level-changing portions including those at both ends of the elements and the line which connect corresponding vertexes of adjacent level-changing portions were made to be 97°. The catalyst elements thus obtained were assembled in a metal frame and calcined while being ventilated at 500° C. for 2 hours to obtain a catalyst structure as shown in FIG. 1(b).

Figure 11:
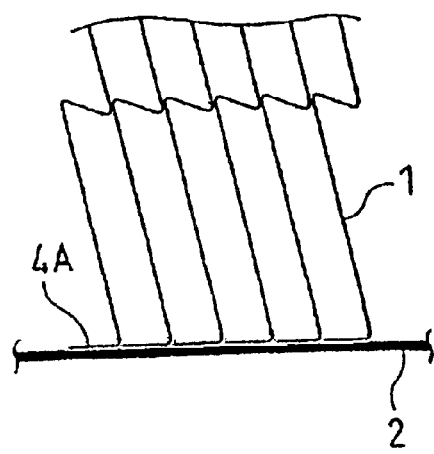
FIG. 11 is an enlarged drawing showing a condition of an end of a stacked catalyst elements in another catalyst structure of the present invention.

Catalyst structures obtained in Example 6-1 and Example 6-2, respectively, were loaded upon the deck of a truck with the elements being directed to vertical direction as shown in FIG. 11. The truck was driven on a normal road for two hours and the extent of displacement and damages of the catalyst elements were inspected. In the catalyst structure of Example 6-1, displacement or damage of catalyst elements after the test was not noticed since the ends of catalyst elements were supported by the flat surface in level-changing portions and the level-changing portions at the end acted also as spacer. In contrast thereto, in the catalyst structure of Example 6-2, end portions damaged by the shocks at the time of the driving and a phenomenon in which the distance between the elements at the ends became uneven were noticed.

From these facts, it is clear that the second embodiment of the present invention is an improvement of the first embodiment, and the catalyst structures of the second embodiment are excellent ones having a sufficient strength.

EXAMPLE 7

Catalyst substrates were obtained by impregnating netlike products prepared by plain weaving twisted yarns each of 1400 E glass fibers having a fiber diameter of 9 $\mu$m at a density of 10 yarns/25.4 mm with a slurry containing 40% of titania, 20% of silica sol, and 1% of polyvinyl alcohol, and then drying at 150° C. to impart a rigidity.

On the other hand, 0.25 kg of ammonium paramolybdate $((NH_4)_6 \cdot Mo_7O_{24} \cdot 4H_2O)$, 0.23 kg of ammonium metavanadate $(NH_4VO_3)$, and 0.3 kg of oxalic acid were added to 1.2 kg of titanium oxide having a specific surface area of 270 $m^2$/g in a separate step, a silica sol of 20% by weight was further added thereto in an amount of 8% by weight in terms of $SiO_2$, and then the mixture was kneaded while adding water to form a paste. To the paste was added kaolin type inorganic fibers (trade name Kaowool) in an amount of 15% by weight and further kneaded to obtain a paste having a water content of 30.5%.

After the paste thus obtained was placed between two sheet of the catalyst substrates of 500 mm wide prepared by the previous procedures, and applied on the surface of the netlike product and in the meshes thereof by pressing them with a pair of press rolls, the substrates were cut to a length of 480 mm to obtain plate-like catalyst substrates of 0.7 mm thick. Subsequently, each of the substrates was inserted in a mold and pressed while being heated to dry to form catalyst elements having many flat plate portions having a length L of 44 mm and level-changing portions having a height h of 1.8 mm. The catalyst elements thus obtained were stacked through netlike products which were prepared by cutting a woven fabric composed of E glass fibers, imparted with a rigidity described above, and used as catalyst substrates to a square of 480 mm per side, placed in a metallic frame, and calcined while being ventilated at 500° C. for 2 hours to obtain a catalyst structure.

EXAMPLE 8

Ammonium metatungstate $((NH_4)_6 \cdot H_2W_{12}O_{40} \cdot 23H_2O)$ in an amount of 3.8 kg and 1.28 kg of ammonium metavanadate $(NH_4VO_3)$ were added to 67 kg of a slurry of metatitanic acid ($TiO_2$ content: 30% by weight, $SO_4$ content: 8% by weight) and kneaded by using a heating kneader while evaporating water to obtain a paste containing about 36% of water. Subsequently, this paste was extruded into a rod-like material of 3 $\phi$, pelletized, dried in a fluidized drier, and then calcined in the atmosphere at 250° C. for 2 hours. The pellets thus obtained were ground with a hammer mill into powders having an average diameter of 5 $\mu$m. The powders thus obtained in an amount of 20 kg, 3 kg of $Al_2O_3 \cdot SiO_2$ type inorganic fibers, and 10 kg of water were kneaded by using a kneader for 1 hour to make them paste-like. This catalyst paste was applied on the surface of SUS304 metal lath substrates having a width of 490 mm and a thickness of 0.2 mm and in the meshes thereof by using a roller press to obtain a plate-like catalyst substrates of 0.9 mm thick. The flat catalyst substrates were formed with a press mold into catalyst elements so that the length L of flat plate portions in the catalyst elements became 60 mm and the height h of level-changing portions became 5 mm. The catalyst elements thus obtained were stacked through the netlike products which were prepared by cutting the SUS304 metal lath substrates described above and used as substrates for catalyst elements to a square of 480 mm per side, placed in a metallic frame, and calcined while being ventilated at 500° C. for 2 hours to obtain a catalyst structure.

EXAMPLES 9 AND 10

Ammonium paramolybdate $((NH_4)_6 \cdot Mo_7O_{24} \cdot 4H_2O)$ in an amount of 0.25 kg, 0.23 kg of ammonium metavanadate $(NH_4VO_3)$, and 0.3 kg of oxalic acid were added to 1.2 kg of titanium oxide having a specific surface area of 270 $m^2/g$, and the mixture was kneaded while adding water to form a clay-like material and then extruded into a rod-like material of 3 $\phi$, and then pelletized by using an extruder and pelletizer. The pellets thus obtained were dried, calcined at 250° C. for 2 hours, ground with a pulverizer to obtain catalyst powders more than 60% of which had particle diameter of less than 1 $\mu m$. Water was added to the powders thus obtained to prepare a catalyst slurry having a solid content of 40%. Netlike products used in Examples 7 and 8, respectively, were impregnated with the catalyst slurry, pulled up from the slurry, subjected to an air blow to remove an excess amount of the slurry existing in the meshes of the netlike products, and then further dried to obtain netlike products on the surface of which the catalyst component was coated. Catalyst structures of Example 9 and Example 10 were obtained by using the netlike products obtained in the same manner as in Example 7 and Example 8 with the exception that the netlike products in Examples 9 and 10 were used in place of those in Examples 7 and 8.

With respect to the catalyst structures in Examples 7 to 10, deformation of the shape of gas flow passages at both ends of catalyst structures were examined, and denitration performance was determined under the conditions shown in Table 5. The results thus obtained are shown in Table 6.

TABLE 5

| Item | Numerical value |
| --- | --- |
| $NO_x$ concentration (ppm) | 80 |
| $NH_3/NO_x$ (-) | 1.2 |
| Temperature (° C.) | 350 |
| SV ($h^{-1}$) | 45,000 |

TABLE 6

| Example | Catalyst component | Netlike product | Deformation of shape of gas flow passages at both ends | Denitration ratio (%) |
| --- | --- | --- | --- | --- |
| 7 | Ti/Mo/V | Reinforced woven fabric of glass fibers | None | 79.6 |
| 8 | Ti/W/V | Metal lath | None | 65.2 |
| 9 | Ti/Mo/V | Reinforced woven fabric of glass fibers coated with catalyst | None | 90.1 |
| 10 | Ti/W/V | Metal lath coated with catalyst | None | 84.1 |

As will be seen from Table 6, in Examples 7 and 8, deformation of the shape of gas flow passages at both ends of catalyst structures was not noticed, and denitration ratio was increased due to the gas flow disturbing (agitating) effect caused by the netlike products disposed between catalyst elements compared with the case wherein netlike products were not used. From these facts, it can be understood that the catalyst structures of the present invention have a high strength, uniform gas flow passages, and an increased denitration ratio.

Next, when Examples 7 and 8 were compared with Examples 9 and 10, it can be seen that a catalyst performance is increased in Examples 9 and 10 compared with Examples 7 and 8 due to the fact that netlike products coated with a catalyst component were used and thus the catalyst is positioned in gas flow passages which have the largest gas flow disturbing effect.

As described above, according to the present invention, not only catalyst structures which hardly cause the clash or deformation of gas flow passages and have a high strength can be obtained, but also catalyst performances are remarkably improved.

EXAMPLE 11

Catalyst substrates were obtained by impregnating netlike products prepared by plain weaving by using twisted yarns each of 800 E glass fibers having a fiber diameter of 9 $\mu m$ as warps and twisted yarns each of 2000 the glass fibers as wefts at a density of 10 yarns/25.4 mm with a slurry containing 40% of titania, 20% of silica sol, and 1% of polyvinyl alcohol, and then dried at 150° C. to impart a rigidity.

On the other hand, 0.25 kg of ammonium paramolybdate $((NH_4)_6 \cdot Mo_7O_{24} \cdot 4H_2O)$, 0.23 kg of ammonium metavanadate $(NH_4VO_3)$, and 0.3 kg of oxalic acid were added to 1.2 kg of titanium oxide having a specific surface area of 270 $m^2/g$ in a separate step, a silica sol of 20% by weight was further added thereto in an amount of 8% by weight in terms of $SiO_2$, and then the mixture was kneaded while adding water to form a paste. To the paste was added kaolin type inorganic fibers (trade name Kaowool) in an amount of 15% by weight and further kneaded to obtain a paste having a water content of 30.5%.

After the paste thus obtained was placed between two sheet of the substrates of 500 mm wide prepared by the previous procedures, and applied on the surface of the netlike product and in the meshes thereof by pressing them with a pair of press rolls, the substrates were cut to a length of 480 mm to obtain plate-like catalyst substrates of 0.7 mm thick. Subsequently, each of the catalyst substrates was inserted in a mold and pressed while being heated to dry to form catalyst elements 1 having level-changing portions as shown in FIG. 12(a). The catalyst elements 1, and woven fabrics 23 prepared by cutting the catalyst substrates which were bestowed with a rigidity in advance and described above to a square of 480 mm per side and used to obtain catalyst structures were alternately stacked as shown in FIG. 12(c). At this time, the fabrics were arranged so that the direction of the warps became parallel to that of gas flow. The stacked elements thus obtained were placed in a metallic frame 2 and calcined while being ventilated at 500° C. for 2 hours to obtain a catalyst structure.

EXAMPLE 12

Titanium oxide ($TiO_2$) powders, ammonium metatungstate (($NH_4$)$_6 \cdot H_2W_{12}O_{40} \cdot 23H_2O$), and ammonium metavanadate ($NH_4VO_3$) were weighed, respectively, such that the molar ratio of Ti/W/V became 89/5/6. Water was added to the mixture in an amount of 30% by weight based on the amount of the titanium oxide described above and kneaded for 30 minute, and kaolin type inorganic fibers (trade name Kaowool) was further added thereto in an amount of 25% by weight based on the amount of the titanium oxide and kneaded for 30 minutes to obtain a catalyst paste. The catalyst paste was applied to substrates of glass fiber woven fabrics having a width of 500 mm and thickness of 0.34 mm to obtain flat plate-like catalyst substrates of 0.7 mm thick. The catalyst substrates were cut to a square of 480 mm per side and formed by using a heating mold to obtain catalyst elements having level-changing portions parallel to that of one side thereof.

On the other hand, a woven fabric prepared by leno weaving by using twisted yarns of 200 and 800 E glass fibers having a fiber diameter of 9 μm as warps and wefts, respectively, was cut to a square of 480 mm per side and used as woven fabrics to obtain a catalyst structure. Density of the woven fabrics having meshes was 9.8 yarns/25 mm.

The catalyst elements thus obtained and the woven fabrics were alternately stacked with the direction of the warps being arranged to be parallel to that of gas flow, placed in a metallic frame, calcined while being ventilated at 500° C. for 2 hours to obtain a catalyst structure.

EXAMPLE 13

Ammonium paramolybdate (($NH_4$)$_6 \cdot Mo_7O_{24} \cdot 4H_2O$) in an amount of 0.25 kg, 0.23 kg of ammonium metavanadate ($NH_4VO_3$), and 0.3 kg of oxalic acid were added to 1.2 kg of titanium oxide having a specific surface area of 270 m$^2$/g, and the mixture was kneaded while adding water to form a clay-like material, extruded into a rod-like material of 3 φ, and then pelletized by using an extruder and pelletizer. The pellets thus obtained were dried, calcined at 550° C. for 2 hours, ground with a pulvelizer to obtain catalyst powders more than 60% of which had particle diameter of less than 1 μm. Water was added to the powders thus obtained to prepare a catalyst slurry having a solid content of 40%. Netlike products used in Examples 11 were impregnated with the catalyst slurry, pulled up from the slurry, subjected to an air blow to remove an excess amount of the slurry existing in the meshes of the netlike products, and then dried to obtain woven fabrics on the surface of which the catalyst component was coated. Similar catalyst structure was obtained in the same manner as in Example 11 with the exception that the woven fabrics obtained were used as those to be disposed between catalyst elements.

EXAMPLE 14

Catalyst structure was obtained in the same manner as in Example 11 with the exception that the density of the woven fabrics and the wefts in Example 11 were changed to 9 yarns/25.4 mm and twisted yarns of 2220 E glass fibers, respectively.

EXAMPLE 15

Catalyst structure was obtained in the same manner as in Example 11 with the exception that the density of the woven fabrics and the wefts in Example 11 were changed to 8 yarns/25.4 mm and twisted yarns of 2500 E glass fibers, respectively.
(Comparative Example 6 was skipped.)

COMPARATIVE EXAMPLE 7

Catalyst structure was obtained in the same manner as in Example 11 with the exception that the number of E glass fibers in both twisted yarns for the warps and wefts in Example 11 was changed to 1400.

COMPARATIVE EXAMPLE 8

Catalyst structure was obtained in the same manner as in Example 11 with the exception that the number of E glass fibers in both twisted yarns for the warps and wefts in Example 11 was changed to 2000.

With respect to the catalyst structures in Examples 11, 14, and 15, and Comparative Examples 7 and 8, the shape of woven fabrics were examined, and denitration performance was determined under the conditions shown in Table 7. The results thus obtained are shown in Table 8.

TABLE 7

| Item | Numerical value |
| --- | --- |
| $NO_x$ concentration (ppm) | 80 |
| $NH_3/NO_x$ (—) | 1.2 |
| Temperature (° C.) | 350 |
| SV (h$^{-1}$) | 45,000 |

TABLE 8

| | Density of fabrics (number of yarns/25.4 mm) | Number of twisted yarns | | Ratio of openings in woven fabrics (%) | Denitration ratio (%) |
| --- | --- | --- | --- | --- | --- |
| | | Warps | Wefts | | |
| Example 11 | 10 | 800 | 2000 | 62 | 80.7 |
| Example 14 | 9 | 800 | 2220 | 62 | 81.6 |
| Example 15 | 8 | 800 | 2500 | 62 | 83.4 |
| Comp. Example 7 | 10 | 1400 | 1400 | 62 | 79.6 |
| Comp. Example 8 | 10 | 2000 | 2000 | 48 | 75.1 |

From Table 8, it can be understood that when denitration ratio was compared between Example 11 and Comparative Example 7, denitration ratio in Example 11 in which yarns having a larger diameter were arranged in the direction perpendicular to that of gas flow was higher than Comparative Example 7 in which the diameter of yarns was the same in two directions of vertical and horizontal. Besides, from the comparison between Comparative Example 7 and Comparative Example 8, it can be seen that denitration ratio is decreased when the diameter of yarns in both directions of vertical and horizontal were made larger. This is considered to be based on the fact that the ratio of openings in woven fabrics is lowered and the disturbance of gas flow was reduced in this case. Further, when Examples 11, 14, and 15 were compared, it can be understood that when the ratio of the openings is the same, the larger the diameter of yarns in the direction perpendicular to that of gas flow and thus the larger the size of openings in woven fabrics, the larger the size of meshes in woven fabrics, the higher becomes denitration ratio.

What is claimed is:

1. A catalyst structure for purifying an exhaust gas comprising a stack of two or more catalyst elements and a frame to house the stack, each of the catalyst elements being formed by bending a rectangular or square plate supporting a catalyst component on its surface into a shape of stairs in the direction parallel to that of a pair of sides of the plate at a predetermined interval so that flat plate portions and level-changing portions are alternately formed in the element, the catalyst elements being stacked such that the position of the level-changing portions are shifted by a predetermined length between adjoining catalyst elements, the catalyst elements forming gas flow passages having a rectangular or rhombic cross section between the adjoining catalyst element, and the length of each of the catalyst elements is an integral multiple of the sum of the height of the level-changing portions and the length of the flat plate portions.

2. A process for producing a catalyst structure for purifying an exhaust gas comprising forming a predetermined length of flat plate portions and a predetermined height of level-changing portions alternately in a belt-shaped substrate for catalyst element so that a stairs-like substrate is prepared, cutting in turn the flat plate portions of the stairs-like substrate thus obtained in the direction parallel to that of the edges formed by the level-changing portions and the flat plate portion s such that the following relation is established between the whole length W of each of the cut catalyst elements and the distance L between adjacent level-changing portions in each of the elements:

$$W = n \times L + L - d$$

wherein n represents the number of the level-changing portions per one sheet of the element, and d represents a constant which is smaller than L but Larger than 0, to form two or more catalyst elements, and then stacking the catalyst elements.

3. The process for producing a catalyst structure for purifying an exhaust gas according to claim 2 wherein a catalyst component having a catalytic activity is supported on the belt-shaped substrate for an catalyst element before or after the belt-shaped substrate is cut into catalyst elements having a predetermined whole length of W.

4. A process for producing a catalyst structure for purifying an exhaust gas comprising cutting in advance a belt-shaped substrate for catalyst element to such a predetermined length that the following relation is established between the whole length W of each of the catalyst elements and the distance L between adjacent level-changing portions in each of the elements to be formed:

$$W = n \times L + L - d$$

wherein in represents the number of the level-changing portions per one sheet of the element, and d represents a constant which is smaller than L but larger than 0, to obtain two or more unit catalyst elements, forming a predetermined length of flat plate portions and a predetermined height of level-changing portions alternately in each of the catalyst elements so that the position of the flat plate portions and the level-changing portions to be formed are each shifted by a length of d between adjoining catalyst elements, and then stacking the catalyst elements.

5. The process for producing a catalyst structure for purifying an exhaust gas according to claim 4 wherein a catalyst component is supported on the belt-shaped substrate for catalyst element before or after the substrate is cut into catalyst elements having a predetermined whole length of W.

* * * * *